United States Patent Office 3,496,252
Patented Feb. 17, 1970

3,496,252
PROCESS FOR PREPARING ALPHA-OLEFIN HOMO-POLYMERS AND COPOLYMERS OF HIGH CRYSTALLINITY FROM AN ALPHA-OLEFIN OF AT LEAST THREE CARBON ATOMS AND CATALYST THEREFOR
Teiji Kato, 132–7 Oaza Shozoku, Iwakuni-shi; Juntaro Sasaki, 2–5, 1-chome, Muronoki-machi, Iwakuni-shi; and Tadao Iwata, 394 Waki Wakison, Kuga-gun, all of Yamaguchi-ken, Japan
No Drawing. Filed Aug. 18, 1966, Ser. No. 573,205
Claims priority, application Japan, Aug. 27, 1965, 40/51,893; Dec. 21, 1965, 40/78,367; Dec. 24, 1965, 40/79,324, 40/79,325, 40/79,326
Int. Cl. C08f 1/56, 15/04, 3/02
U.S. Cl. 260—878          7 Claims

ABSTRACT OF THE DISCLOSURE

A process for preparing alpha-olefin homopolymers and copolymers of high crystallinity comprising polymerizing at least one alpha-olefin containing not less than 3 carbon atoms in the presence of a catalytic mixture consisting essentially of (a) at least one halide of a tri-valent transition metal of groups IV or V of the periodic table, (b) an aluminum compound represented by the formula $RAlX_2$, wherein X is halogen and R is a member selected from the group consisting of hydrogen, alkyl and aryl, and (c) a metal complex of the formula $M_2M'F_6$, wherein M is a metal selected from group I–A of the periodic table and M' is a metal selected from group IV of said table.

---

This invention relates to a process for preparing olefinic polymers and copolymers having high crystallinity using a new three-component catalyst system.

An object of this invention is to provide olefinic polymers having high crystallinity by either homopolymerizing alpha-olefins containing not less than 3 carbon atoms, or copolymerizing said olefins with alpha-olefins other than the same.

The catalyst to be used in this invention is obtained by mixing (a) a halogen compound of a low valency transition metal of groups IV or V of the periodic table,
(b) an organic aluminum compound of the formula $RAlX_2$, wherein X is halogen, R is hydrogen, alkyl or aryl, and
(c) a metal complex of the fomrula $M_2M'F_6$, wherein M is a group I–A metal and M' is a group IV metal.

The periodic table as used herein refers to that shown in the periodic table according to Mendeleeff.

It is known that the catalyst consisting of the combination of a halogen compound of a low valency transition metal, the component (a) of this invention, and an aluminum compound of the formula $RAlX_2$, the component (b), exhibits either no catalytic activity at all in polymerizing the olefinic hydrocarbons, or is very low, even if shown. Moreover, the resulting polymer does not possess stereospecificity. Further, the catalyst combination consisting of a metal complex of the formula $M_2M'F_6$, the component (c) of this invention and the component (b) $RAlX_2$ is neither effective at all as a catalyst for the polymerization of the olefinic hydrocarbons. Again, the catalyst combination of a transition metal halogen compound, the component (a) the catalyst used in this invention, and a metal complex of the formula $M'M'F_6$, the component (c) thereof, does not polymerize either the olefinic hydrocarbon at all.

We discovered that though the combination of any of the two of the foregoing three components, as hereinbefore noted, did not exhibit catalytic activity with respect to stereospecific polymerization the catalyst consisting of all three components in complete contradistinction to the two-component system polymerized the olefinic hydrocarbons with high catalytic activity, the resulting polymer being moreover a high molecular weight polymer having a high degree of crystallinity.

Furthermore, since the component (b) and the component (c) react, the catalytic system formed is one which is entirely discrete from the catalyst system consisting merely of a mixture of the component (a) and (b).

According to this invention, crystalline polymers are obtained by bringing at least one alpha-olefin into contact with a catalyst which has as its indispensable constituent requisites the three compounds consisting of a halogen compound of a low valency transition metal of either groups IV or V of the periodic table, an aluminum compound of the formula $RAlX_2$ and a metal complex of the formula $M_2M'F_6$.

Of the low valency transition metal halogen compounds, which are used as the (a) component is practising this invention, particularly suitable in view of the activity of the resulting catalyst are the halogen compounds of titanium and vanadium. As the titanium halogen compounds, included are titanium trichloride and the trivalent titanium complexes. The former is obtained by reducing titanium tetrachloride with either hydrogen or the metals such as metallic aluminum, metallic silicon, etc., and the latter are the trivalent titanium complexes obtained by the method of reducing titanium tetrachloride with organometallic compounds, as fully disclosed in U.S. Patent 2,954,367 (corresponding patents: British Patent No. 795,182 and Dutch Patent No. 1,049,584), U.S. Patent 3,058,963 (corresponding patent: British Patent No. 789,781) and British Patent No. 862,608. Suitable in particular are the titanium trivalent complexes which have been obtained by reacting a titanium tetrahalide such as titanium tetrachloride or titanium tetrabromide at a temperature below 100° C. with an organometallic compound of a metal of groups I to III of the periodic table, such as for examples butyl lithium, phenyl potassium, dimethyl zinc, triethylaluminum, diethylaluminum chloride, ethylaluminum dichloride, ethylaluminum sesquichloride, diethylaluminum hydride, ethylaluminum dihydride and lithiumaluminum tetraethyl. Further, the foregoing complexes which have been obtained by reacting at a temperature below 100° C. can be used with still greater satisfaction when they are heat treated at from 100° C. to 180° C. As the halogen compounds of vanadium, vanadium trichloride or those complexes of vanadium which have been obtained by reacting vanadium tetrachloride with the aforementioned organometallic compounds can be conveniently used.

On the other hand, organoaluminum compound of the formula $RAlX_2$, included are those compounds in which preferably the X is either chlorine, bromine or iodine and R is either a $C_1$–$C_7$ alkyl group such as ethyl, propyl, butyl, isopropyl, isobutyl, isoamyl and hexyl, or an aryl group such as phenyl and tolyl, or hydrogen. Of these, ethylaluminum dichloride is especially used with convenience.

As to the metal complex of the formula $M_2M'F_6$, of which at least one is used, the M therein being an alkali metal of group I–A of the periodic table, of which K, Na and Li are superior, and M' being a metal of group IV, of which Ti, Si, Sn and Zr are particularly excellent. Desirably used of these metal complexes are, for example, lithium titanium fluoride ($Li_2TiF_6$), sodium titanium fluoride ($Na_2TiF_6$), potassium titanium fluoride ($K_2TiF_6$), lithium silicon fluoride ($Li_2SiF_6$), sodium silicon fluoride ($Na_2SiF_6$), potassium silicon fluoride ($K_2SiF_6$), lithium zirconium fluoride ($Li_2ZrF_6$), sodium zirconium fluoride ($Na_2ZrF_6$), potassium zirconium fluoride ($K_2ZrF_6$), lithium tin fluoride ($Li_2SnF_6$), sodium tin fluoride ($Na_2SnF_6$) and potasium tin fluoride ($K_2SnF_6$).

The possession of catalytic activity is a point that is common to all the combinations of the catalyst according to this invention, but when viewed from the point of their catalytic activity as well as ease of handling, that in which the following three components have been combined greatly excels the others and hence is used with especial advantages.

(a) At least one halogen compound of a low valency transition metal consisting of titanium and vanadium;
(b) An aluminum compound of the formula $RAlX_2$, wherein X is halogen, and R is hydrogen, $C_1$–$C_7$ alkyl group or a phenyl group with or without a substituent; and
(c) A metal complex of the formula $M_2M'F_6$ wherein M is Li, Na or K, and M' is Ti, Si, Sn or Zr.

Although the mole ratios of the catalyst components used in this invention can be changed in a broad range, such as a ratio of the transition metal halide (a) to the $RAlX_2$ (b) of from 10:1 to 1:20 and that of $RAlX_2$ (b) to the $M_2M'F_6$ (c) of from 20:1 to 1:10, the molar ratios that are usually convenient are those where the molar ratio of the component (a) to the component (b) is from 2:1 to 1:10 and that of the component (b) to the component (c) is from 15:1 to 1:2.

The conditions under which the catalyst components of the invention are mixed can be optionally chosen. For instance, the sequence of mixing temperature, the mixing equipment, etc., are possible of wide variation. As to the mixing sequence, the three components may be mixed at the same time, or $RAlX_2$, the component (b), and $M_2M'F_6$, the component (c) may be mixed and aged, followed by addition of the transition metal halide, the component (a). Alternatively, $RAlX_2$, the component (b) and $M_2M'F_6$, the component (c) may be mixed first and then when aging is to be performed a further addition of $RAlX_2$, the component (b) may be made when adding the transition metal halogen compound, the component (a). While the temperature at which the components are mixed may range between −20° C. and 200° C., usually the mixing is carried out conveniently at between room temperature and 180° C. Further, after having been mixed the three components or the components (b) and (c), it is preferred that the mixture be aged at a temperature between 50° and 180° C. under a nitrogen atmosphere.

In carrying out the mixing, a suitable diluent, for example, an inert hydrocarbon liquid medium such as heptane or kerosene may also be used, if necessary. The concentration of the catalyst can be chosen from a broad range of from, say, 0.1 millimole per liter to the instance where the mixing is carried out with no dilution whatsoever. Again, when in preparing the catalyst composition using a liquid medium and particularly in mixing the components (b) and (c) in advance and then aging the mixture, there are instances where precipitation results from the mixture. In this case, it is possible to use this mixture by adding the component (a) thereto without filtering off the precipitate at all, but it is also possible either to use the filtrate by adding the component (a) thereto as a polymerization catalyst.

While the invention catalysts are used for the homopolymerization of olefinic hydrocarbons, usually the alpha-olefins of at least 3 carbon atoms, and also the copolymerization of said alpha-olefins with the alpha-olefins differing from said olefins, such as ethylene, propylene, butene and styrene, said catalysts are particularly suitable for obtaining the stereospecific polymers from the asymmetric olefinic hydrocarbons such as propylene, butene and styrene, or the branched olefinic hydrocarbons such as 3-methylbutene-1, 3-methylhexene-1, 4-methylpentene-1 and 5-methylhexene-1.

In copolymerizing an alpha-olefin with other olefins, two or more olefins, in their mixed state, are contacted with the catalyst to obtain a random copolymer. However, for obtaining highly crystalline polymers by using, as described, a mixture of two or more olefins, the mixture ratio of the olefins preferably should be one in which one of the olefins is contained in a mole ratio of not more than 10 mol percent. For instance, an olefin mixture consisting of propylene and ethylene in a mole ratio of 95 to 5 can be contacted with the invention catalyst to obtain a random copolymer.

Further, as another mode of obtaining copolymers of two or more olefins using the invention catalyst system, the block polymerization can be conveniently carried out. In the block copolymerization reaction, two or more different olefins are catalyzed either partially independently or partially in their mixed state, it being possible to vary the sequence of combination. For obtaining highly crystalline polymer in the case of a copolymer containing a random copolymeric block of two or more olefins, the composition of the olefinic monomers making up the resulting polymeric chain is preferably such that a major part thereof is an olefin of not less than $C_3$ and in particular the content of the monomeric units of ethylene or the other alpha-olefins to be copolymerized therewith is not more than 15 mol percent.

In practising this invention, any of the various methods of polymerization can be chosen. The operations of mixing and aging the catalyst as well as the polymerization reaction can all be carried out very readily without any particular difficulty whether the butchwise or continuous method is chosen. Again, an inert organic diluent may be used during the polymerization, or the reaction can be carried out without using any diluent at all but by suspending the catalyst in the monomers. As the diluent to be used in this case, it is common practice to use the same type as that used in preparing the catalyst.

The temperature and pressure during the polymerization reaction can be optionally chosen in consideration of such as the class of monomers used, the concentration of the catalyst and the degree of polymerization desired, but usually a temperature ranging between −20° and 100° C. and a pressure of the order of between subatmospheric and a superatmospheric pressure of 50 atmospheres can be used. It is of course also possible to use pressures higher than this.

In carrying out the invention, a chain transfer agent such as gaseous hydrogen, alkyl halides or organic compounds containing active hydrogen can be copresent in the polymerization system to control suitably the molecular weight of the resulting polymer. Hardly any decline in the crystallinity of the resulting polymer takes place by the introduction of the chain transfer agent at this time. Needless to say, the reaction is carried out in the absence of substantially any oxygen or water.

Further, according to this invention, the stereospecificity of the polymer obtained is relatively higher than that obtained by the prior art catalyst systems.

The following examples are given for further illustrating the invention.

In the examples, the molecular weight of polypropylene is the viscosity average molecular weight as calculated by the equation of R. Chiang [J. Polymer Sci. 28 235 (1958)]. The value indicated by $[\eta]$ is the intrinsic viscosity measured in decalin at 135° C. and a concentration of 0.1 g./100 cc., and calculated using the Martin's constant as proposed by R. Chiang. The value indicated as extraction residue is the rate of solid polymer remaining after extraction with hot heptane for 24 hours. The brittle temperature is a value measured according to ASTM D746–57T.

The separation of the polymer from the polymeric mixture obtained by the polymerization reaction was accomplished by first decomposing the catalyst with methanol, following which the solid powdery polymer was filtered, washed with methanol and dried.

EXAMPLE 1

A 500-cc. polymerization vessel was charged with 250 cc. of purified kerosene, after which were added thereto in an atmosphere of nitrogen, titanium trichloride (Titanium Trichloride A.A., a product of Stauffer Chemical Co., obtained by the reduction of titanium tetrachloride with metallic aluminum), ethylaluminum dichloride and a metal complex indicated in Table I. The temperature of the reaction mixture was then raised to 70° C. and the mixture was stirred for 30 minutes, following which the polymerization reaction was carried out for 5 hours at normal atmospheric pressure by introducing propylene.

The properties of the so obtained polymers are shown in Table I, below.

TABLE I

| Catalyst | | | Polypropylene | | | |
| --- | --- | --- | --- | --- | --- | --- |
| Component (a) | Component (b) | Component (c) | Yield, grams | Molecular Weight | $(\eta)$ | Extraction Residue, percent |
| $TiCl_3$ 1.23 grams (8 mmols) | $C_2H_5AlCl_2$ 2.8 grams (22 mmols) | $Na_2TiF_6$ 1.0 grams (4.2 mmols) | 88 | $61 \times 10^4$ | 4.3 | 93 |
| $TiCl_3$ do | $C_2H_5AlCl_2$ do | $K_2TiF_6$ 1.2 grams (5.0 mmols) | 109 | $61 \times 10^4$ | 4.3 | 94 |
| $TiCl_3$ do | $C_2H_5AlCl_2$ do | $K_2SiF_6$ 1.1 grams (4.4 mmols) | 95 | $61 \times 10^4$ | 4.3 | 94 |
| $TiCl_3$ do | $C_2H_5AlCl_2$ do | $K_2ZrF_6$ 2.4 grams (7.7 mmols) | 43 | $73 \times 10^4$ | 5.0 | 92 |
| $TiCl_3$ 1.54 grams (10 mmols) | $C_2H_5AlCl_2$ do | $K_2SnF_6$ 3.1 grams (2.5 mmols) | 102 | $63 \times 10^4$ | 4.4 | 89 |

EXAMPLE 2

Propylene was polymerized as in Example 1, excepting that the ratio of titanium trichloride (Titanium Trichloride A.A.), ethylaluminum dichloride and potassium titanium fluoride was varied. The results obtained are shown in Table II.

TABLE II

| Catalyst | | | Polypropylene | | | |
| --- | --- | --- | --- | --- | --- | --- |
| Component (a) | Component (b) | Component (c) | Yield, grams | Molecular Weight | $(\eta)$ | Extraction Residue, percent |
| $TiCl_3$ 1.23 grams (8 mmols) | $C_2H_5AlCl_2$ 0.5 gram (4 mmols) | $K_2TiF_6$ 0.5 gram (2 mmols) | 42 | $72 \times 10^4$ | 4.9 | 95 |
| $TiCl_3$ do | $C_2H_5AlCl_2$ 10.2 grams (80 mmols) | $K_2TiF_6$ 9.6 grams (40 mmols) | 131 | $65 \times 10^4$ | 4.5 | 92 |
| $TiCl_3$ do | $C_2H_5AlCl_2$ 2.0 grams (16 mmols) | $K_2TiF_6$ 0.2 gram (1 mmol) | 19 | $56 \times 10^4$ | 4.0 | 92 |
| $TiCl_3$ do | $C_2H_5AlCl_2$ 2.0 grams (16 mmols) | $K_2TiF_6$ 7.7 grams (32 mmols) | 90 | $61 \times 10^4$ | 4.3 | 94 |

Comparison 1

Eleven 2000-cc. autoclaves each filled with 750 cc. of hexane were charged respectively with the catalysts consisting of the following (a) and (b), (a) and one selected from the group (c), and (b) and one selected from the group (c).

|   | Grams |
| --- | --- |
| (a) Titanium trichloride of Example 1 | 10.8 |
| (b) Ethylaluminum dichloride | 10.5 |
| (c) A metal complex selected from the next group: | |
| $Na_2TiF_6$ | 15.6 |
| $K_2TiF_6$ | 18.0 |
| $K_2SiF_6$ | 16.5 |
| $K_2ZrF_6$ | 18.0 |
| $K_2SnF_6$ | 22.0 |

Propylene was blown in as in Example 1, but the presence of a solid polymer could not be observed in any of the eleven autoclaves.

EXAMPLE 3

Organoaluminum compounds and metal complexes were reacted under a nitrogen atmosphere in a 200-cc. flask containing 75 cc. of refined kerosene, the reaction being carried out under the conditions indicated in Table III. Half of the reaction mixture was then charged to a 500-cc. polymerization vessel filled with 250 cc. of heptane, to which was further added 1.5 grams of titanium trichloride (same as that used in Example 1), after which the polymerization reaction was carried out by introducing propylene for 5 hours at 70° C. with the results shown in Table III, below.

TABLE III

| Catalyst | | | | Polypropylene | | |
| --- | --- | --- | --- | --- | --- | --- |
| Component (b) | Component (c) | Ageing Conditions, °C./1 hr. | Component (a) | Yield, grams | Molecular Weight | Extraction Residue, percent |
| $C_6H_5AlCl_2$ 11.0 grams | $Li_2TiF_6$ 3.5 grams | 140 | $TiCl_3$ 1.5 grams | 73 | $52 \times 10^4$ | 91 |
| $C_6H_5AlCl_2$ do | $K_2TiF_6$ 4.8 grams | 70 | $TiCl_3$ do | 123 | $58 \times 10^4$ | 96 |
| $C_6H_5AlCl_2$ do | $Na_2SiF_6$ 3.8 grams | 120 | $TiCl_3$ do | 105 | $60 \times 10^4$ | 93 |
| $C_6H_5AlCl_2$ do | $Na_2ZrF_6$ 4.5 grams | 120 | $TiCl_3$ do | 37 | $65 \times 10^4$ | 89 |
| $C_6H_5AlCl_2$ do | $K_2SiF_6$ 3.5 grams | 70 | $TiCl_3$ do | 360 | $65 \times 10^4$ | 95 |
| $C_6H_5AlCl_2$ do | $K_2ZrF_6$ 4.9 grams | 70 | $TiCl_3$ do | 120 | $70 \times 10^4$ | 90 |
| $C_6H_5AlCl_2$ do | $Na_2SnF_6$ 5.8 grams | 120 | $TiCl_3$ do | 89 | $67 \times 10^4$ | 91 |

Comparison II

The respective reaction products of the organoaluminum compound and the metal complexes, as prepared in Example 3, were each placed in a 2-liter autoclave, and propylene was blown in at a pressure of 7 kg./cm.$^2$-g. at 70° C. and the stirring was continued for 5 hours, but the formation of solid polymers could not be noted.

EXAMPLE 4

A 2-liter autoclave was charged with 500 cc. of heptane, after which were added thereto under an atmosphere of nitrogen 2.5 grams of titanium trichloride (same as that used in Example 1), 12.3 grams of propylaluminum dibromide and 2.1 grams of sodium titanium fluoride. The temperature of the autoclave was then raised to 110° C., at which temperature stirring was carried out for 2 hours, after which the temperature was lowered to 70° C. and propylene was introduced into the autoclave at the rate of 40 liters per hour. The pressure inside the autoclave gradually rose during the polymerization reaction. After 5 hours the polymerization reaction was stopped, and after the usual post-treatments, 270 grams of a white powdery solid were obtained. The insoluble portion was 94% when extraction was carried out with hot heptane. The viscosity average molecular weight of this polymer was $61 \times 10^4$.

EXAMPLE 5

After charging 500 cc. of heptane to a 2-liter autoclave, the catalysts indicated in Table IV were added, followed by stirring for 2 hours at 110° C. and then lowering the temperature to 70° C. After introducing hydrogen to a pressure of 1.5 kg./cm.$^2$-g., the polymerization reaction was carried out for 5 hours by introducing propylene into the autoclave at the rate of 40 liters per hour.

TABLE IV

| Catalyst | | | | | | Polypropylene | | |
|---|---|---|---|---|---|---|---|---|
| Component (a) | | Component (b) | | Component (c) | | Yield, grams | Molecular Weight | Extraction Residue, percent |
| TiCl₃* | 2.5 grams | n-C₃H₇AlBr₂ | 12.3 grams | Na₂TiF₆ | 2.1 grams | 253 | 46×10⁴ | 93 |
| TiCl₃ | do | n-C₃H₇AlBr₂ | do | K₂TiF₆ | 2.4 grams | 325 | 45×10⁴ | 95 |
| TiCl₃* | 3.0 grams | n-C₃H₇AlBr₂ | do | K₂SiF₆ | 4.9 grams | 320 | 46×10⁴ | 92 |
| TiCl₃ | do | n-C₃H₇AlBr₂ | do | K₂ZrF₆ | 4.4 grams | 115 | 37×10⁴ | 87 |
| TiCl₃ | 3.1 grams | n-C₃H₇AlBr₂ | 12.6 grams | K₂SnF₆ | 6.2 grams | 330 | 42×10⁴ | 90 |

*The titanium trichloride as used in Example I.

EXAMPLE 6

Isopropylaluminum dichloride and a metal complex indicated in Table V were added to 75 cc. of kerosene, after which the mixture was stirred for 3 hours at 100° C. under an atmosphere of nitrogen. This reaction product and 1.5 grams of titanium trichloride obtained by reduction of titanium tetrachloride with hydrogen (Titanium Trichloride H.A., a product of Stauffer Chemical Co.) were added to 175 cc. of kerosene, following which the polymerization reaction was carried out for 5 hours by introducing propylene at 70° C., with the results shown in Table V.

TABLE V

| Catalyst | | | | | | Polypropylene | | |
|---|---|---|---|---|---|---|---|---|
| Component (b) | | Component (c) | | Component (a) | | Yield, grams | Molecular Weight | Extraction Residue, Percent |
| i-C₃H₇AlCl₂ | 2.1 grams | Na₂TiF₆ | 1.0 grams | TiCl₃ | 1.5 grams | 48 | 51×10⁴ | 82 |
| i-C₃H₇AlCl₂ | do | K₂TiF₆ | 1.2 grams | TiCl₃ | do | 73 | 57×10⁴ | 85 |
| i-C₃H₇AlCl₂ | do | K₂SiF₆ | do | TiCl₃ | do | 55 | 53×10⁴ | 82 |
| i-C₃H₇AlCl₂ | do | K₂ZrF₆ | 1.7 grams | TiCl₃ | do | 28 | 68×10⁴ | 81 |
| i-C₃H₇AlCl₂ | 3.5 grams | LiSnF₆ | 3.1 grams | TiCl₃ | do | 60 | 49×10⁴ | 82 |

EXAMPLE 7

112.5 grams of titanium tetrachloride were dissolved in one liter of refined kerosene, after which 60 grams of ethylaluminum dichloride were added with stirring under a nitrogen atmosphere at room temperature. After completion of the addition, the stirring was continued for further 5 hours at 40° C., and then the precipitate formed was separated by decantation. After washing the precipitate with refined kerosene, it was resuspended in refined heptane and the concentration of the trivalent titanium was determined quantitatively by titration submitted to quantitative analysis by titration.

After reacting phenylaluminum dichloride and a metal complex for one hour at 70° C. in a 100-cc. flask containing 40 cc. of refined heptane, under an atmosphere of nitrogen, the reaction mixture was charged to a 500-cc. polymerization vessel filled with 250 cc. of heptane. To this were then added 10 cc. of the foregoing suspension (1.0 mol/l.-solution) of trivalent titanium complex, following which propylene was polymerized for 5 hours at 70° C.

TABLE VI

| Catalyst | | | | Polypropylene | | |
|---|---|---|---|---|---|---|
| Component (b) | | Component (c) | | Yield, grams | Molecular Weight | Extraction Residue, Percent |
| C₆H₅AlCl₂ | 5.5 grams | Na₂TiF₆ | 1.8 grams | 68 | 53×10⁴ | 92 |
| C₆H₅AlCl₂ | do | K₂TiF₆ | 2.4 grams | 86 | 80×10⁴ | 89 |
| C₆H₅AlCl₂ | do | K₂SiF₆ | 1.8 grams | 89 | 63×10⁴ | 85 |
| C₆H₅AlCl₂ | do | K₂ZrF₆ | 2.5 grams | 35 | 71×10⁴ | 85 |

Comparison III

Ten cc. of the heptane solution of trivalent complex of Example 7, 5.5 grams of phenylaluminum dichloride and 250 cc. of refined heptane were placed in a polymerization vessel and was similarly fed with propylene, but hardly any solid polymers could be noted.

EXAMPLE 8

Fifty-five grams of titanium tetrachloride were dissolved in one liter of refined kerosene, after which 60 grams of ethylaluminum dichloride were added to the solution with stirring at room temperature under a nitrogen atmosphere. After completion of the dropping, the solution was stirred for further 5 hours, following which the precipitate formed was separated by decantation. The precipitate was washed three times with refined kerosene and then resuspended in refined kerosene.

250 cc. of refined kerosene was placed in a 500-cc. polymerization vessel, to which were then added 10 cc. of the foregoing suspension (1 mol/l.) of trivalent titanium complex, 2.8 grams of ethylaluminum dichloride and 3.1 grams of potassium tin fluoride, after which propylene was polymerized at 70° C. The yield of the resulting polypropylene was 64 grams, its molecular weight was 6×10⁴ and the extraction residue was 84%.

EXAMPLE 9

Except that the reaction product of titanium tetrachloride and ethylaluminum dichloride, as used in Example 7, was treated for 2 hours at 150° C. before being separated as a precipitate and used as the trivalent titanium complex, the experiment was otherwise carried out as described in Example 7.

TABLE VII

| | Polypropylene | | |
|---|---|---|---|
| Metal Complex (Component (c)) | Yield, grams | Molecular Weight | Extraction Residue, Percent |
| Na₂TiF₆ | 93 | 48×10⁴ | 95 |
| K₂TiF₆ | 115 | 63×10⁴ | 97 |
| K₂SiF₆ | 125 | 42×10⁴ | 97 |
| K₂ZrF₆ | 63 | 40×10⁴ | 94 |

EXAMPLE 10

A 500-cc. polymerization vessel was charged with 250 cc. of refined kerosene, after which were added in an atmosphere of nitrogen titanium trichloride (Titanium Trichloride A.A.), an organoaluminum compound and a metal complex as indicated in Table VIII, followed by raising the temperature to 70° C. After stirring the mixture for 30 minutes, butene-1 was blown in and polymerized for 5 hours at normal atmospheric pressure.

TABLE VIII

| Catalyst | | | Yield, grams | Extraction Residue, Percent |
|---|---|---|---|---|
| Component (a) | Component (b) | Component (c) | | |
| $TiCl_3$ _____ 1.23 grams___ | $C_2H_5AlCl_2$ __ 2.8 grams____ | $Na_2TiF_6$ ____ 1.0 gram_____ | 52 | 86 |
| $TiCl_3$ _____do_____ | $C_2H_5AlCl_2$ _____do_____ | $K_2SiF_6$ _____ 1.1 grams____ | 62 | 80 |
| $TiCl_3$ _____do_____ | $C_2H_5AlCl_2$ _____do_____ | $K_2ZrF_6$ _____ 2.4 grams____ | 30 | 75 |
| $TiCl_3$ _____do_____ | $i-C_3H_7AlBr_2$ 6.2 grams____ | $K_2TiF_6$ _____ 1.2 grams____ | 65 | 88 |
| $TiCl_3$ _____ 1.54 grams___ | $C_2H_5AlCl$ 2.8 grams____ | $K_2SnF_6$ _____ 3.1 grams____ | 59 | 81 |

EXAMPLE 11

A 500-cc. polymerization vessel was charged with 250 cc. of refined heptane, to which were then added in a nitrogen atmosphere titanium trichloride (Titanium Trichloride A.A.), ethylaluminum dichloride and a metal complex indicated in Table VIII. After stirring the mixture in a nitrogen atmosphere under the catalyst aging conditions specified in Table VIII, the temperature was lowered to 40° C., 100 cc. of 4-methylpentene-1 were added and polymerized for 3 hours at normal atmospheric pressure. After decomposing the catalyst with methanol, a solid powdery poly(4-methylpentene-1) was obtained. The results of X-ray diffraction and infrared absorption spectrum analyses showed that the polymer obtained was highly crystalline poly(4-methylpentene-1).

to room temperature, the precipitate was caused to be thoroughly settled and then separated from the mother liquor by decantation. Kerosene was added to the precipitate portion to resuspend it and washed by repeating the previously described washing operation for a total of five times, after which the precipitate was suspended in refined heptane.

Fifty cc. of heptane, 3.5 grams of phenylaluminum dichloride and 2.4 grams of potassium titanium fluoride were placed in a separate reactor and reacted for 30 minutes at 80° C. under a nitrogen atmosphere. To this reaction mixture were added 10 cc. of the foregoing titanium complex suspension (titanium concentration=1.0 mol/liter) and 100 cc. of heptane, after which the reaction mixture was cooled to 15° C., 100 cc. of 3-methylbutene-1

TABLE IX

| Catalyst | | | | Polymethylpentene | | |
|---|---|---|---|---|---|---|
| Component (a) | Component (b) | Component (c) | Aging Conditions | Yield, grams | $(\eta)$ | Extraction Residue, percent |
| $TiCl_3$ _____ 1.54 grams___ | $C_2H_5AlCl_2$ 2.8 grams____ | $K_2TiF_6$ 2.1 grams___ | 130° C./2 hr_ | 52 | 7.3 | 90 |
| $TiCl_3$ _____do_____ | $C_2H_5AlCl_2$ _____do_____ | $K_2SiF_6$ 2.2 grams____ | 70° C./2 hr_ | 63 | 8.5 | 92 |
| $TiCl_3$ _____do_____ | $C_2H_5AlCl_2$ _____do_____ | $K_2ZrF_6$ 2.4 grams____ | 120° C./1 hr_ | 45 | 8.0 | 93 |
| $TiCl_3$ _____do_____ | $C_2H_5AlCl_2$ _____do_____ | $K_2SnF_6$ 3.1 grams____ | 70° C./2 hr__ | 58 | 8.6 | 90 |

EXAMPLE 12

46.6 grams of diethylaluminum chloride were dissolved in one liter of refined kerosene, after which 112.5 grams of titanium tetrachloride were dropped in the solution with stirring at room temperature under a nitrogen atmosphere. After continuing the stirring for 3 hours, the temperature was raised to 130° C., followed by stirring for further 2 hours and 30 minutes. The resultant mixture was then cooled to room temperature to settle the precipitate completely, following which the precipitate was separated from the mother liquor by decantation. Kerosene was added to the precipitate portion to resuspend it, and then repeating the washing operation for 5 times in accordance with the previously described procedure, the precipitate was suspended in refined heptane. (Titanium concentration=1.0 mol/liter.)

Fifty cc. of heptane, 2.8 g. of ethylaluminum dichloride and 1.8 grams of lithium titanium chloride were placed in a separate reactor and reacted for 2 hours at 140° C. under an atmosphere of nitrogen. To this reaction mixture were added 10 cc. of the foregoing titanium complex suspension and 100 cc. of heptane, followed by cooling to 15° C. and the addition of 100 cc. of 3-methylbutene-1. After continuing the stirring for 5 hours at a temperature of 15° to 20° C. under an atmosphere of nitrogen, methanol was added to decompose the catalyst, and thereafter by washing thoroughly with methanol and then drying under reduced pressure 33 grams of a white powery polymer were obtained.

The $[\eta]$ of this polymer was 2.10, and results of infrared analysis showed that it was highly crystalline poly-(3-methylbutene-1).

EXAMPLE 13

112.5 grams of titanium tetrachloride were dissolved in one liter of refined kerosene, to which solution were then dropped with stirring 185 grams of propylaluminum dibromide at room temperature under an atmosphere of nitrogen. After continuing the stirring for 3 hours, the temperature was raised and further stirring was carried out for 2 hours and 30 minutes. After cooling the solution were added, and the stirring of the mixture was continued for 5 hours at a temperature of 15° to 20° C. under a nitrogen atmosphere. By carrying out the post-treatment as in Example 1, 50 grams of a white powdery polymer were obtained.

The $[\eta]$ of this polymer was 3.3, and the results of its infrared analysis showed it to be highly crystalline poly-(3-methylbutene-1).

EXAMPLE 14

125 grams of vanadium tetrachloride were dissolved in one liter of refined heptane, after which 59 grams of ethylaluminum sesquichloride were gradually added with stirring under a nitrogen atmosphere while cooling the reactor with ice water. The temperature of the reactor was raised to 40° C., after which stirring was continued for 6 hours at 40° C., and thereafter the resulting precipitate of vanadium complex was separated from the mother liquor by decantation. The so obtained precipitate was then washed 4 times with heptane following which it was resuspended in 650 cc. of heptane.

Fifty cc. of refined kerosene, a metal complex indicated in Table X, and 2.8 grams of ethylaluminum dichloride were charged to a separate reactor whose temperature was raised to 140° C. to carry out the reaction for 2 hours under an atmosphere of nitrogen. To this reaction mixture were then added 10 cc. of the foregoing vanadium complex suspension, 190 cc. of heptane and 100 cc. of 5 methylhexene-1, and the polymerization reaction was carried out for 3 hours at 50° C. with stirring. After the polymerization reaction the reaction product was treated with alcohol to yield a white powdery poly(5-methylhexene-1).

TABLE X

| Metal Complex | Polymethylhexene | |
|---|---|---|
| | Yield, grams | $(\eta)$ |
| $Na_2TiF_6$ _____ 2.1 grams _____ | 13 | 4.1 |
| $K_2TiF_6$ _____ 2.4 grams_____ | 18 | 4.0 |
| $Na_2SiF_6$ _____ 1.9 grams_____ | 16 | 4.2 |
| $Na_2ZrF_6$ _____ 2.3 grams_____ | 3 | 4.5 |

EXAMPLE 15

A 500-cc. polymerization vessel was charged with 250 cc. of refined kerosene, and then in a nitrogen atmosphere were added titanium trichloride (Titanium Trichloride A.A.), an aluminum compound and a metal complex, as indicated in Table XI, following which the reaction mixture was stirred for 30 minutes at 70° C. Thereafter, a gaseous mixture composed of 95 parts by volume of propylene and 5 parts by volume of ethylene was introduced and polymerized for 5 hours.

TABLE XI

| Catalyst | | | Copolymer | |
| --- | --- | --- | --- | --- |
| Component (a) | Component (b) | Component (c) | Yield, grams | Extraction Residue, Percent |
| $TiCl_3$ 1.23 grams | $C_2H_5AlCl_2$ 2.8 grams | $Na_2TiF_6$ 1.0 gram | 70 | 84 |
| $TiCl_3$ do | $C_2H_5AlCl_2$ do | $K_2SiF_6$ 1.1 grams | 89 | 87 |
| $TiCl_3$ do | $C_2H_5AlCl_2$ do | $K_2ZrF_6$ 2.4 grams | 40 | 85 |
| $TiCl_3$ do | $i\text{-}C_3H_7AlBr_2$ 6.2 grams | $K_2TiF_6$ 1.2 grams | 86 | 84 |
| $TiCl_3$ 1.54 grams | $C_2H_5AlCl_2$ 2.8 grams | $K_2SnF_6$ 3.1 grams | 92 | 86 |

EXAMPLE 16

A 2-liter autoclave was charged with 500 cc. of heptane, after which were added titanium trichloride (Titanium Trichloride A.A.), propylaluminum dibromide and a metal complex indicated in Table XII. The temperature of the autoclave was then raised to 110° C., and propylene was introduced for 2 hours at 70° C. at the rate of 40 liters per hour, with stirring. After the polymerization reaction was carried out for 5 hours, the gas in the system was promptly expelled, following which ethylene was fed for 30 minutes at the rate of 20 liters per hour. After the feeding of the ethylene was stopped, the reaction mixture was stirred for another 20 minutes, methanol was added to decompose the catalyst, thereby obtaining a white powdery polymer.

TABLE XII

| Catalyst | | | Copolymer | | | | |
| --- | --- | --- | --- | --- | --- | --- | --- |
| Component (a) | Component (b) | Component (c) | Yield, grams | Molecular* weight | Extraction Residue, percent | Ethylene Content, percent | Temperature (Brittle), °C. |
| $TiCl_3$ 2.5 grams | $C_3H_7AlBR_2$ 12.3 grams | $Na_2TiF_6$ 2.1 grams | 325 | $57 \times 10^4$ | 92 | 2.0 | −2 |
| $TiCl_3$ do | $C_3H_7AlBR_2$ do | $K_2TiF_6$ 2.4 grams | 345 | $59 \times 10^4$ | 94 | 2.4 | −2 |
| $TiCl_3$ 3.0 grams | $C_3H_7AlBR_2$ do | $K_2SiF_6$ 4.9 grams | 360 | $60 \times 10^4$ | 92 | 2.6 | −3 |
| $TiCl_3$ do | $C_3H_7AlBR_2$ do | $K_2ZrF_6$ 4.4 grams | 130 | $65 \times 10^4$ | 92 | 1.5 | 0 |
| $TiCl_3$ 3.1 grams | $C_3H_7AlBR_2$ 12.6 grams | $K_2SnF_6$ 6.2 grams | 385 | $58 \times 10^4$ | 88 | 2.0 | −1 |

*Computed by R. Chiang's polypropylene formula.

EXAMPLE 17

Using the catalyst described in Example 16, propylene was fed for 4 hours at 40 liters per hour under identical conditions as in said example, after which a gaseous mixture of 30 parts by volume of ethylene and 70 parts by volume of propylene was fed for 1.5 hours at 20 liters per hour, whereupon a white powdery polymer was obtained.

TABLE XIII

| Metal Complex | Copolymer | | | | |
| --- | --- | --- | --- | --- | --- |
| | Yield, grams | Molecular Weight* | Extraction Residue, Percent | Ethylene Content, Percent | Brittle temperature, °C. |
| $Na_2TiF_6$ | 320 | $55 \times 10^4$ | 90 | 2.3 | −3 |
| $K_2TiF_6$ | 330 | $56 \times 10^4$ | 90 | 2.0 | −3 |
| $K_2SiF_6$ | 352 | $56 \times 10^4$ | 91 | 2.0 | −4 |
| $K_2ZrF_6$ | 115 | $62 \times 10^4$ | 87 | 2.0 | −2 |
| $K_2SnF_6$ | 382 | $59 \times 10^4$ | 85 | 2.2 | −3.5 |

*Computed by R. Chiang's polypropylene formula.

EXAMPLE 18

218 grams of titanium tetrabromide were dissolved in one liter of refined kerosene, following which were added thereto with stirring at room temperature under a nitrogen atmosphere 38 grams of diethylaluminum chloride. After completion of the dropping, the mixture was stirred for 5 hours at 40° C., following which the resulting precipitate was separated by decantation. The so obtained precipitate was then washed for 5 times with refined kerosene, after which it was resuspended in refined heptane and aged for 1.5 hours at 150° C. under a nitrogen atmosphere. Then concentration of titanium was quantatively analyzed by titration. In a separate reactor were placed 50 cc. of heptane, 5.6 grams of propylaluminum dibromide and 2.4 grams of potassium titanium fluoride, and under a nitrogen atmosphere the temperature of the mixture was raised to 70° C. and the reaction thereof was carried out for 2 hours. To this reaction mixture were added 10 cc. of the foregoing suspension of titanium complex (titanium concentration=1.0 mol./liter), 190 cc. of heptane and 100 cc. of 4-methylpentene-1, and then polymerized for 3 hours at 40° C. with stirring. Throughout the polymerization reaction nitrogen gas containing 5% by volume of ethylene was gently passed through.

After giving the resulting polymer the post-treatments described in Example 1, 59 grams of a white powdery polymer was obtained.

The results of an infrared absorption spectrum analysis of this polymer demonstrated that it was a copolymer of ethylene and 4-methylpentene-1 containing 3.8% of monomeric ethylene units and that it had a high degree of crystallinity. The reduced viscosity of this copolymer was 9.3, and its residue when extracted for 24 hours with hot heptane was 90% by weight.

EXAMPLE 19

2.8 grams of ethylaluminum dichloride, 2.4 grams of potassium titanium fluoride and 100 cc. of heptane were charged to a polymerization vessel and stirred for one hour at 75° C. in an atmosphere of nitrogen. To the reaction mixture were then added 1.54 grams of titanium trichloride (Titanium Trichloride A.A.) and 150 cc. of heptane, followed by passing propylene through the mixture for 30 minutes at 60° C., with stirring. The feed of propylene was then stopped and the atmosphere was replaced with nitrogen. After continuing the stirring for another 20 minutes, 100 cc. of 4-methylpentene-1 was dropped over a period of 20 minutes from a dropping funnel. After continuing the stirring of the reaction mixture for 3 hours at 60° C. under an atmosphere of nitrogen, 200 cc. of methanol were added to decompose the catalyst. The resulting white powdery polymer was well washed with methanol and dried under reduced pressure. The yield of the polymer was 83 grams.

The extraction residue of this polymer after extracting for 24 hours with hot heptane was 86%. Further, the results of an infrared spectrum analysis demonstrated that this polymer was a highly crystalline polymer containing in a great amount a block copolymer of propylene and 4-methylpentene-1.

EXAMPLE 20

112.5 grams of titanium tetrachloride were dissolved in one liter of refined kerosene, to which were then dropped slowly at room temperature 59 grams of ethylaluminum sesquichloride. The reaction mixture was then stirred for 5 hours at 40° C., followed by further stirring for 3 hours at 140° C. The precipitate formed was separated from the mother liquor by decantation and washed for 5 times with heptane, following which the resulting titanium complex was resuspended in heptane.

In a separate reactor were charged 100 cc. of kerosene, 12.4 grams of butylaluminum dichloride and a metal complex indicated in Table XIV, following which the mixture was heated for 3 hours at 120° C. in an atmosphere of nitrogen with stirring.

A 500-cc. polymerization vessel was charged under a nitrogen atmosphere with 250 cc. of heptane, 10 cc. of the foregoing heptane suspension of titanium complex and 25 cc. of the supernatant liquid of said resultant mixture of butylaluminum dichloride and metal complex.

100 cc. of 4-methylpentene-1 were added to the resultant mixture, and the polymerization reaction was carried out for 4 hours at 50° C. while passing nitrogen gas containing 10% each of propylene and hydrogen slowly through the resultant mixture. The results of an infrared analysis of the resulting polymers showed that they were in all cases highly crystalline polymers containing a random copolymeric portion of 4-methylpentene-1 and propylene.

TABLE XIV

| Metal complex | | Yield, grams | $(\eta)$ | Extraction Residue, Percent |
|---|---|---|---|---|
| $Na_2TiF_6$ | 16.6 grams | 48 | 3.3 | 78 |
| $K_2TiF_6$ | 19.2 grams | 52 | 3.2 | 81 |
| $K_2SiF_6$ | 17.6 grams | 54 | 2.8 | 85 |
| $K_2ZrF_6$ | 19.5 grams | 40 | 2.5 | 84 |

We claim:

1. A process for preparing alpha-olefin homopolymers and copolymers having high crystallinity which comprises homopolymerizing an alpha-olefin containing not less than 3 carbon atoms or copolymerizing the same with ethylene or other alpha-olefins in the presence of a catalytic mixture consisting essentially of
    (a) at least one halide of a tri-valent transition metal of groups IV or V of the periodic table,
    (b) an aluminum compound represented by the formula $RAlX_2$, wherein X is halogen and R is a member selected from the group consisting of hydrogen, alkyl and aryl, and
    (c) a metal complex of the formula $M_2M'F_6$, wherein M is a metal selected from group I–A of the periodic table and M' is a metal selected from group IV of said table.

2. The process according to claim 1 which comprises homopolymerizing an alpha-olefin containing 3 to 7 carbon atoms or copolymerizing said alpha-olefin with ethylene or other alpha-olefins in the presence of a catalytic mixture consisting essentially of
    (a) at least one halide of a tri-valent transition metal selected from the group consisting of titanium and vanadium,
    (b) an aluminum compound represented by the formula $RAlX_2$, wherein X is halogen and R is a member selected from the group consisting of hydrogen, $C_1$ to $C_7$ alkyls, phenyl and tolyl, and
    (c) a metal complex represented by the formula $M_2M'F_6$ wherein M is selected from the group consisting of Li, Na and K and M' is selected from the group consisting of Ti, Si, Sn and Zr.

3. The process according to claim 1 wherein said polymerization reaction is effected in the presence of a liquid medium.

4. The process according to claim 1 wherein said homopolymer and copolymer is a member selected from the group consisting of polypropylene, propylene-ethylene copolymer, poly 4 - methylpentene-1,4-methylpentene-1-propylene copolymer and 4-methylpentene-1-ethylene copolymer.

5. The process according to claim 1 wherein said catalyst is obtained by mixing the three components of (a), (b) and (c) in a proportion such that mole ratio of component (a) to component (b) ranges between 10:1 and 1:20, and preferably between 2:1 and 1:10, and the mole ratio of component (b) to component (c) ranges between 20:1 and 1:10, and preferably 15:1 and 1:2.

6. A catalyst for polymerizing olefins consisting essentially of
    (a) at least one halide of a trivalent transition metal of groups IV or V of the periodic table,
    (b) an aluminum compound represented by the formula $RAlX_2$, wherein X is halogen and R is a member selected from the group consisting of hydrogen, alkyl and aryl, and
    (c) a metal complex of the formula $M_2M'F_6$, wherein M is a metal selected from group I–A of the periodic table and M' is a metal selected from group IV of said table.

7. A catalyst for polymerizing olefins consisting essentially of
    (a) at least a halide of a tri-valent transition metal selected from the group consisting of titanium and vanadium,
    (b) an aluminum compound represented by the formula $RAlX_2$, wherein X is halogen and R is a member selected from the group consisting of hydrogen, $C_1$ to $C_7$ alkyls, phenyl and tolyl, and
    (c) a metal complex represented by the formula $M_2M'F_6$ wherein M is selected from the group consisting of Li, Na and K and M' is selected from the group consisting of Ti, Si, Sn and Zr.

References Cited

UNITED STATES PATENTS 3,378,539   4/1968   Nowlin et al. _____ 260—93.7
2,910,461  10/1959   Nowlin et al. _____ 260—94.9

JOSEPH L. SCHOFER, Primary Examiner

EDWARD J. SMITH, Assistant Examiner

U.S. Cl. X.R.

252—429; 260—88.2, 93.5, 93.7